(12) United States Patent
Huh et al.

(10) Patent No.: US 12,393,871 B2
(45) Date of Patent: Aug. 19, 2025

(54) ELECTRONIC DEVICE AND OPERATION METHOD OF COLLECTING DATA FROM MULTIPLE DEVICES FOR GENERATING AN ARTIFICIAL INTELLIGENCE MODEL

(71) Applicant: Samsung Electronics Co., Ltd., Suwon-si (KR)

(72) Inventors: Junho Huh, Suwon-si (KR); Hosun Lee, Suwon-si (KR); Choonghoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 921 days.

(21) Appl. No.: 17/604,202

(22) PCT Filed: Sep. 15, 2021

(86) PCT No.: PCT/KR2021/012631
§ 371 (c)(1),
(2) Date: Oct. 15, 2021

(87) PCT Pub. No.: WO2022/060105
PCT Pub. Date: Mar. 24, 2022

(65) Prior Publication Data
US 2022/0309394 A1    Sep. 29, 2022

(30) Foreign Application Priority Data

Sep. 18, 2020    (KR) ........................ 10-2020-0120633

(51) Int. Cl.
*G06N 20/00* (2019.01)
*G06F 18/21* (2023.01)
*G06F 18/214* (2023.01)

(52) U.S. Cl.
CPC ........... *G06N 20/00* (2019.01); *G06F 18/214* (2023.01); *G06F 18/2193* (2023.01)

(58) Field of Classification Search
CPC .... G06N 20/00; G06F 18/2193; G06F 18/214
(Continued)

(56) References Cited

U.S. PATENT DOCUMENTS 9,563,854 B2    2/2017    Cruz Mota et al.
10,109,214 B2    10/2018    Baughman et al.
(Continued)

FOREIGN PATENT DOCUMENTS

JP    2019-149018 A    9/2019
JP    2020-502708 A    1/2020
(Continued)

OTHER PUBLICATIONS

International Search Report and Written Opinion dated Dec. 16, 2021, issued in International Patent Application No. PCT/KR2021/012631.
(Continued)

*Primary Examiner* — Hwei-Min Lu
(74) *Attorney, Agent, or Firm* — Jefferson IP Law, LLP

(57) ABSTRACT

An electronic device includes a communication interface, a memory storing one or more instructions, and a processor configured to execute the one or more instructions stored in the memory. The processor is configured to execute the one or more instructions to obtain first data and characteristic information of the first data, control the communication interface to transmit a data request to an external device and receive characteristic information of second data from the external device, control the communication interface to receive the second data from the external device, based on the characteristic information of the first data and the characteristic information of the second data, determine training data including at least a portion of the first data and at least a portion of the second data, and generate the AI model, based on the determined training data.

9 Claims, 12 Drawing Sheets

(58) Field of Classification Search
USPC .......................................................... 706/12
See application file for complete search history.

(56) References Cited

U.S. PATENT DOCUMENTS

| | | | |
|---|---|---|---|
| 10,269,017 B1 | 4/2019 | Phillips et al. | |
| 11,074,599 B2 | 7/2021 | Stolorz | |
| 2015/0088791 A1* | 3/2015 | Lin | G06N 20/10 |
| | | | 706/12 |
| 2015/0206065 A1* | 7/2015 | Abu-Mostafa | G06N 20/00 |
| | | | 706/12 |
| 2015/0264028 A1* | 9/2015 | Kim | H04L 63/0853 |
| | | | 726/3 |
| 2017/0239524 A1* | 8/2017 | Lee | G16H 50/30 |
| 2017/0364832 A1 | 12/2017 | Habermehl et al. | |
| 2018/0197106 A1* | 7/2018 | Fujitani | G06N 20/00 |
| 2018/0307946 A1* | 10/2018 | Kuroda | G06F 16/48 |
| 2019/0220698 A1* | 7/2019 | Pradeep | G06T 7/75 |
| 2019/0373332 A1* | 12/2019 | Kim | G06N 20/20 |
| 2020/0034661 A1* | 1/2020 | Kim | G06V 10/764 |
| 2020/0045163 A1 | 2/2020 | Hwang et al. | |
| 2020/0098356 A1* | 3/2020 | Kim | G10L 15/285 |
| 2020/0111025 A1* | 4/2020 | Han | G06N 20/00 |
| 2020/0118007 A1 | 4/2020 | Hong et al. | |
| 2022/0139092 A1* | 5/2022 | Hashimoto | G06N 3/084 |
| | | | 382/156 |
| 2022/0407809 A1* | 12/2022 | Wu | H04L 47/2441 |

FOREIGN PATENT DOCUMENTS

| | | |
|---|---|---|
| KR | 10-2019-0107621 A | 9/2019 |
| KR | 10-2087973 B1 | 3/2020 |
| KR | 10-2020-0046145 A | 5/2020 |
| KR | 10-2172772 B1 | 11/2020 |

OTHER PUBLICATIONS

Office Action dated Mar. 26, 2025, issued in Korean Patent Application No. 10-2020-0120633.

* cited by examiner

ELECTRONIC DEVICE AND OPERATION METHOD OF COLLECTING DATA FROM MULTIPLE DEVICES FOR GENERATING AN ARTIFICIAL INTELLIGENCE MODEL

TECHNICAL FIELD

The disclosure relates to electronic devices and operation methods of the same. More particularly, the disclosure relates to an electronic device capable of collecting training data for generating an artificial intelligence (AI) model, and an operation method of the electronic device.

BACKGROUND ART

Artificial intelligence (AI) systems are computer systems that implement human-level intelligence. Unlike existing rule-based smart systems, AI systems train itself and make determinations spontaneously to become smarter. Because AI systems increase a recognition rate and more accurately understand user's preferences the more they are used, existing rule-based smart systems are being gradually replaced by deep-learning AI systems.

AI technology includes machine learning (deep learning) and element technologies employing the machine learning. Machine learning is an algorithm technology that self-classifies/learns the characteristics of input data, and uses a machine learning algorithm, such as deep learning, and includes technical fields, such as linguistic understanding, visual understanding, deduction/prediction, knowledge representation, and operation control.

Element technologies for implementing AI technology may include at least one of linguistic understanding technology that recognizes human language/text, visual understanding technology that recognizes objects like human vision, deduction/prediction that logically performs deduction and prediction by determining information, knowledge representation that processes human experience information as knowledge data, vehicle's autonomous traveling, or operation control for controlling a motion of a robot.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an electronic device capable of collecting training data for directly generating an artificial intelligence (AI) model from external devices, and an operation method of the electronic device.

Additional aspects will be set forth in part in the description which follows and, in part, will be apparent from the description, or may be learned by practice of the presented embodiments.

Technical Solution to Problem

In accordance with an aspect of the disclosure, an electronic device for collecting training data for generating an artificial intelligence (AI) model is provided. The electronic device includes a communication interface, a memory storing one or more instructions, and a processor configured to execute the one or more instructions stored in the memory. The processor is configured to execute the one or more instructions to obtain first data and characteristic information of the first data, control the communication interface to transmit a data request to an external device and receive characteristic information of second data from the external device, control the communication interface to receive the second data from the external device, based on the characteristic information of the first data and the characteristic information of the second data, determine training data including at least a portion of the first data and at least a portion of the second data, and generate the AI model, based on the determined training data.

The processor may be further configured to execute the one or more instructions to determine whether to receive the second data, based on a collection state of the first data and a difference between the characteristic information of the first data and the characteristic information of the second data.

The processor may be further configured to execute the one or more instructions to control the communication interface to receive the second data, when a collection amount of the first data is less than a preset value and the difference between the characteristic information of the first data and the characteristic information of the second data is less than a first threshold value.

The processor may be further configured to execute the one or more instructions to control the communication interface to receive the second data, when the collection amount of the first data is greater than the preset value and the difference between the characteristic information of the first data and the characteristic information of the second data is greater than a second threshold value.

Characteristic information according to an embodiment of the disclosure may include distribution information of data, and the distribution information of the data may include at least one of an average, a standard deviation, a variance, a maximum value, a minimum value, or a distribution curve of the data.

The electronic device may further include a sensing unit configured to sense the first data, and the processor may be further configured to execute the one or more instructions to obtain distribution information including at least one of an average, a standard deviation, a variance, a maximum value, a minimum value, or a distribution curve of the sensed first data.

The processor may be further configured to execute the one or more instructions to determine the training data by including at least a portion of the first data and at least a portion of the second data in the training data so that a preset balance of characteristic information for the training data is maintained.

The electronic device may further include a sensing unit configured to sense data of a user of the electronic device, and the processor may be further configured to execute the one or more instructions to obtain demographic information of the user of the electronic device, based on the data of the user of the electronic device, control the communication interface to receive demographic information of a user of the external device, and determine the training data including at least a portion of the first data and at least a portion of the second data, based on the demographic information of the user of the electronic device and the demographic information of the user of the external device.

The sensing unit may be further configured to obtain at least one of touch information, voice information, location information, or step distance information of the user of the electronic device, and the processor may be further configured to execute the one or more instructions to obtain the demographic information of the user of the electronic device, based on at least one of the touch information, voice information, location information, step distance information of the user of the electronic device, or keyboard type information used by the user of the electronic device.

The processor may be further configured to execute the one or more instructions to determine the training data including at least a portion of the first data and at least a portion of the second data so that at least one of a preset balance of characteristic information for the training data or a preset balance of demographic information for the training data is maintained.

The processor may be further configured to execute the one or more instructions to search for the external device located around the electronic device and control the communication interface to transmit a data request to the external device, when the found external device satisfies a preset condition.

The processor may be further configured to execute the one or more instructions to control the communication interface to transmit information of the number of necessary data samples to the external device and receive the second data sampled based on the information of the number of data samples.

In accordance with another aspect of the disclosure, an operation method of an electronic device for collecting training data for generating an AI model is provided. The operation method includes obtaining first data and characteristic information of the first data, transmitting a data request to an external device, receiving characteristic information of second data from the external device, receiving the second data from the external device, based on characteristic information of the first data and characteristic information of the second data, determining training data including at least a portion of the first data and at least a portion of the second data, and generating the AI model, based on the determined training data.

Advantageous Effects of Disclosure

An electronic device according to an embodiment of the disclosure may directly collect training data for an artificial intelligence (AI) model from external devices, and, during data collection, does not cause a problem to protect personal information, compared with when collecting data based on a cloud or a server, because the external devices perform authentication of the electronic device and does not need to transmit data sensed by the electronic device to the cloud or the server.

In addition, because the electronic device according to an embodiment of the disclosure may collect training data having various pieces of characteristic information from external devices, performance (accuracy) of the AI model generated based on the collected training data may be increased.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE OF DISCLOSURE

Figure 1:
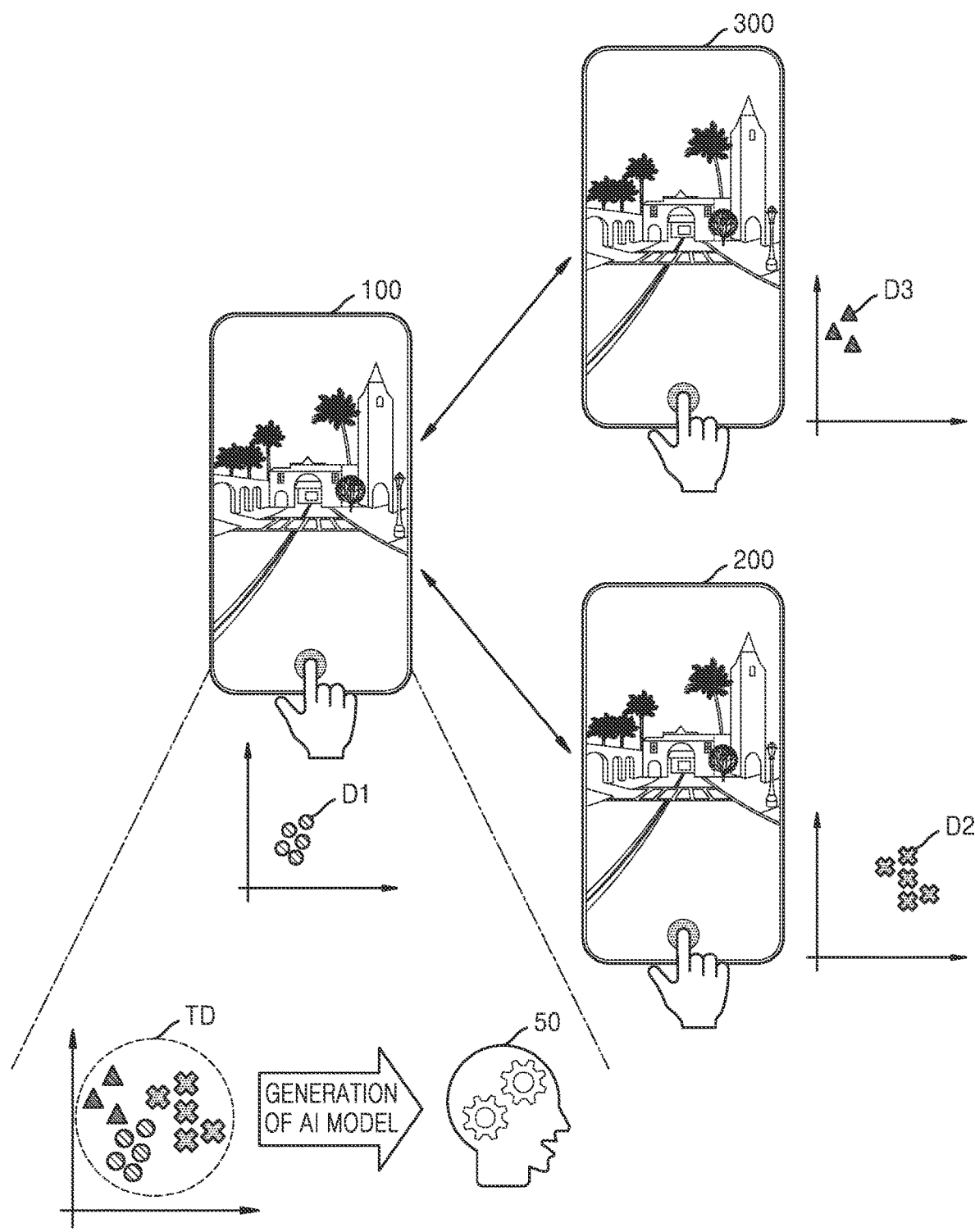
FIG. 1 is a view illustrating a method, performed by a first device, of generating an artificial intelligence (AI) model by collecting training data from a second device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Terms used herein will be described briefly, and the disclosure will be described in detail.

Although general terms widely used at present were selected for describing the disclosure in consideration of the functions thereof, these general terms may vary according to intentions of one of ordinary skill in the art, case precedents, the advent of new technologies, or the like. Terms arbitrarily selected by the applicant of the disclosure may also be used in a specific case. In this case, their meanings need to be given in the detailed description of the disclosure. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

The disclosure will now be described more fully with reference to the accompanying drawings, in which various embodiments of the disclosure are shown. The disclosure may, however, be embodied in many different forms and should not be construed as being limited to the embodiments set forth herein. In the drawings, parts irrelevant to the description are omitted for the simplicity of explanation, and like numbers refer to like elements throughout.

The term "user" used herein denotes a person who controls functions or operations of an electronic device and a system. Examples of the user may include an inventor, a manager, or an installation engineer.

FIG. 1 is a view illustrating a method, performed by a first device, of generating an artificial intelligence (AI) model by collecting training data from a second device according to an embodiment of the disclosure.

Referring to FIG. 1, a first device 100 according to an embodiment of the disclosure may be an electronic device that collects training data from second device 200 and third device 300 and generates an AI model, based on the collected training data. The first device 100 and the second device 200 and third device 300 according to an embodiment of the disclosure may be any type of electronic device, such as a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, a moving picture experts group audio layer 3 (MP3) player, a camcorder, an Internet protocol television (IPTV), a digital television (DTV), or a wearable device.

The first device 100 according to an embodiment of the disclosure may sense data of a first device user (hereinafter, referred to as a first user). For example, the first device 100 may include a sensing unit including at least one of a touch sensor, an image sensor (camera, a position sensor (for example, a global positioning system (GPS)), an acceleration sensor, a gyroscope sensor, a microphone, a magnetic sensor, or a temperature/humidity sensor. The first device 100 may sense data about the first user (hereinafter, referred to as first data) by using the sensing unit.

Although FIG. 1 illustrates an example in which the first device 100 obtains touch information (touch data) of the first user by using a touch sensor, embodiments of the disclosure are not limited thereto. The first device 100 may sense various pieces of data by using various sensors.

The first device 100 according to an embodiment of the disclosure may obtain characteristic information of first data D1 by analyzing the first data D1. The characteristic information of the first data D1 may include distribution information representing statistical characteristics of the first data D1. For example, the distribution information of the first data D1 may include at least one of an average, a standard deviation, a variance, a maximum value, a minimum value, or a distribution curve of the first data D1.

Each of the external devices 200 and 300 may sense user data and may obtain characteristic information of the sensed user data. For example, the second device 200 may obtain second data D2 and characteristic information of the second data D2, and the third device 300 may obtain third data D3 and characteristic information of the third data D3.

The first device 100 according to an embodiment of the disclosure may search for the external devices 200 and 300 located around the first device 100. When the external devices 200 and 300 located around the first device 100 are found, the first device 100 may transmit a data sharing request to the external devices 200 and 300.

When the second device 200 according to an embodiment of the disclosure receives the data sharing request from the first device 100, the second device 200 may verify (authenticate) a user of the first device 100, and, when authentication is completed, the second device 200 may transmit the characteristic information of the second data D2 to the first device 100. The first device 100 may receive the characteristic information of the second data D2 and may compare the characteristic information of the first data D1 with the characteristic information of the second data D2 to thereby determine whether the second data D2 is received. The first device 100 may determine whether the second data D2 is received, based on a collection state of the first data D1 and a difference between the characteristic information of the first data D1 and the characteristic information of the second data D2.

For example, when a collection amount of the first data D1 is equal to or greater than a preset value (when the first data D1 is sufficiently collected) and a difference between the characteristic information of the second data D2 and the characteristic information of the first data D1 is equal to or greater than a first threshold value, the first device 100 may determine that the second data D2 is received. In other words, when the first device 100 collects sufficient first data, the first device 100 may collect data having different characteristics from the first data from the external devices.

On the other hand, when the collection amount of the first data D1 is less than the preset value (when the first data D1 is not sufficiently collected) and the difference between the characteristic information of the second data D2 and the characteristic information of the first data D1 is less than a second threshold value, the first device 100 may determine that the second data D2 is received. In other words, when the first device 100 does not collect sufficient first data, the first device 100 may collect data having similar characteristics to the first data from the external devices. However, embodiments of the disclosure are not limited thereto.

When the third device 300 receives the data sharing request from the first device 100, the third device 300 may verify a user of the first device 100, and, when authentication is completed, the third device 300 may transmit the characteristic information of the third data D3 to the first device 100. The first device 100 may receive the characteristic information of the third data D3 and may compare the characteristic information of the first data D1 with the characteristic information of the third data D3 to thereby determine whether the third data D3 is received. The first device 100 may determine whether the third data D3 is received, based on a collection state of the first data D1 and a difference between the characteristic information of the first data D1 and the characteristic information of the third data D3.

When the first device 100 receives the second data D2 from the second device 200 and pre-stores the second data D2, the first device 100 may compare the characteristic information of the second data D2 with the characteristic information of the third data D3 to thereby determine whether the third data D3 is received. For example, when the difference between the characteristic information of the third data D3 and the characteristic information of the second data D2 is less than the second threshold value, the first device 100 may determine that the third data D3 is not received. However, embodiments of the disclosure are not limited thereto.

The first device 100 according to an embodiment of the disclosure may determine training data TD for generating an AI model 50 according to an embodiment of the disclosure, based on the sensed and obtained first data D1 and the second data D2 and the third data D3 received from the external devices 200 and 300.

At this time, based on the characteristic information of the first data D1, the characteristic information of the second data D2, and the characteristic information of the third data D3, the first device 100 may determine the training data TD to include at least a portion of the first data D1, at least a portion of the second data D2, and at least a portion of the third data D3 so that the characteristic information of the training data maintains a preset balance. However, embodiments of the disclosure are not limited thereto.

The first device 100 according to an embodiment of the disclosure may generate the AI model 50, based on the determined training data TD. For example, the AI model 50 may be an authentication model that authenticates a user, but embodiments of the disclosure are not limited thereto.

The first device 100 according to an embodiment of the disclosure may directly collect the training data from the external devices, and, during data collection, a problem to protect personal information, compared with when collecting data based on a cloud or a server, because the external devices perform authentication of the first device 100 does not occur.

In addition, because the first device 100 may collect the training data having various pieces of characteristic information, performance (accuracy) of the AI model generated based on the collected training data may be increased.

Figure 2:
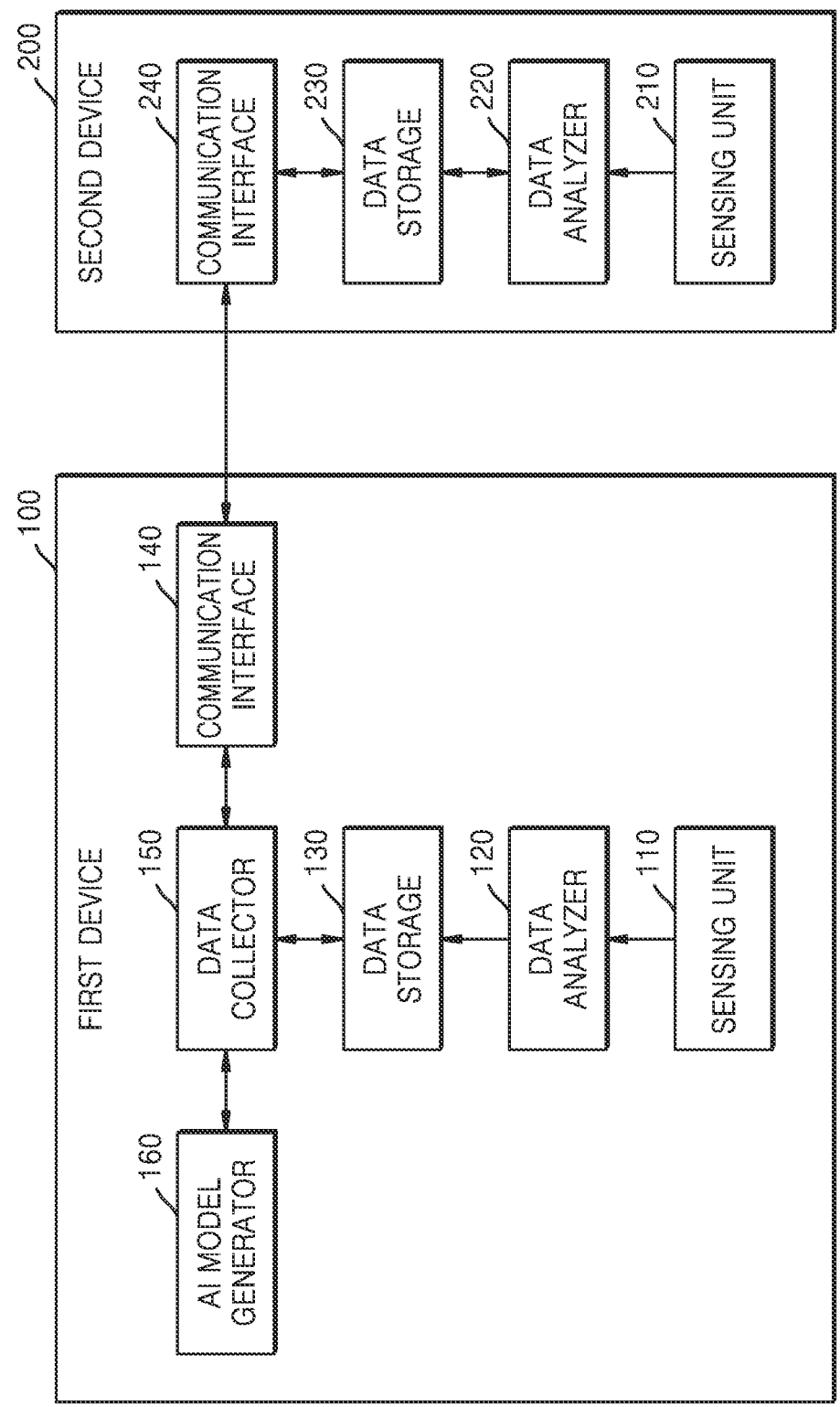
FIG. 2 is a block diagram of structures of a first device and a second device according to an embodiment of the disclosure.

FIG. 2 is a block diagram of structures of the first device and the second device according to an embodiment of the disclosure.

Referring to FIG. 2, a first device 100 according to an embodiment of the disclosure may include a sensing unit 110, a data analyzer 120, a data storage 130, a communication interface 140, a data collector 150, and an AI model generator 160.

The sensing unit 110 according to an embodiment of the disclosure may sense the status of the first device 100 or the status of the surroundings of the first device 100 and may transmit data corresponding to the sensed status to the data analyzer 120.

The sensing unit 110 may include, but is not limited to, at least one of an image sensor, a touch sensor, an acceleration sensor, a position sensor (e.g., a GPS), a temperature/humidity sensor, a magnetic sensor, a gyroscope sensor, an infrared sensor, a pressure sensor, or a proximity sensor. The sensing unit 110 may sense touch information, voice information, position information, step length information, and the like of the first device user (the first user).

The data analyzer 120 according to an embodiment of the disclosure may obtain characteristic information of data and demographic information of the user by analyzing the data collected via the sensing by the sensing unit 110.

The data analyzer 120 may obtain the characteristic information of the first data for each type of the sensed first data. For example, when a preset or greater number of pieces of touch data are collected, the data analyzer 120 may obtain characteristic information for collected touch data by analyzing the collected touch data. The touch data may be expressed as coordinate information of a touch point, touch strength information, touched area information, and the like.

The data analyzer 120 may obtain distribution information including at least one of an average, standard deviation, variance, maximum value, minimum value, or distribution curve for the touch data including the coordinate information of the touch point, the touch strength information, the touched area information, and the like, and may determine the obtained distribution information as the characteristic information for the touch data.

Based on the data (first data) about the first user sensed by the sensing unit 110, the data analyzer 120 may obtain demographic information of the first user.

For example, the data analyzer 120 may obtain information about the finger thickness or hand size of the first user, based on information about the touched area of the touch data. Alternatively, the data analyzer 120 may obtain information about the height or weight of the first user, based on the step length information of the first user. Alternatively, the data analyzer 120 may obtain information about the gender of the first user, based on the voice information of the first user. Alternatively, the data analyzer 120 may obtain information about the location of the house or office of the first user, the occupational group of the first user, and the like, based on the position information of the first user. Alternatively, the data analyzer 120 may obtain information about a language used by the first user, based on keyboard type information used by the first user. However, embodiments of the disclosure are not limited thereto.

The data storage 130 may store the first data obtained by the sensing unit 110 together with the characteristic information of the first data analyzed by the data analyzer 120 and the demographic information of the first user.

The data collector 150 may determine a time point when it is necessary to collect the training data used to generate or update an AI model, and may control overall operations of collecting the training data.

The communication interface 140 according to an embodiment of the disclosure may transmit or receive data or a signal to or from an external device (for example, the second device 200).

The communication interface 140 may include, but is not limited to, a short-range wireless communication interface, a mobile communication interface, and the like, in correspondence with the performance and structure of the first device 100.

The short-range wireless communication interface may include, but is not limited to, a Bluetooth™ communication interface, a Bluetooth low energy (BLE) communication interface, a near field communication (NFC) interface, a wide local area network (WLAN) (wireless fidelity (Wi-Fi®)) communication interface, a Zigbee® communication interface, an infrared data association (IrDA) communication interface, a Wi-Fi Direct™ (WFD) communication interface, an ultra-wideband (UWB) communication interface, an Ant+™ communication interface, and a micro-wave (uWave) communication interface.

The mobile communication interface transmits or receives a wireless signal to or from at least one of a base station, an external terminal, or a server on a mobile communication network. The wireless signal may include various types of data according to transmission or reception of a voice call signal, a video call signal, or a text/multimedia message.

The communication interface 140 according to an embodiment of the disclosure may search for the external devices located around the first device 100. When a found external device is the same type of device as that of the first device 100 or includes the same function as that of the first device 100, the communication interface 140 may receive a response from the external device. However, embodiments of the disclosure are not limited thereto.

Alternatively, the communication interface 140 may receive identification (ID) information of the found external device from the external device, and may compare the received ID information with ID information of the first device 100, thereby determining whether the external device is the same type of device as that of the first device 100 or includes the same function as that of the first device 100.

When a second device that is the same type of device as that of the first device 100 or includes the same function as that of the first device 100 is found, the communication interface 140 may transmit a data sharing request from the second device 200. At this time, the communication interface 140 may also transmit information about data that is to be collected (for example, the type of data or the number of data) to the second device 200.

The communication interface 140 according to an embodiment of the disclosure may receive at least one of characteristic information of the second data or demographic information of the second user from the second device 200.

The data collector 150 may compare the characteristic information of the second data received from the second device 200 with the characteristic information of the first data stored in the data storage 130. The data collector 150 may compare the demographic information of the second data received from the second device 200 with the demographic information of the first user stored in the data storage 130.

For example, the characteristic information of the data may include distribution information representing statistical characteristics of the data, and the distribution information of the data may include at least one of an average, a standard deviation, a variance, a maximum value, a minimum value, or a distribution curve of the data.

The data collector 150 may determine whether the second data is received, based on a collection state of the first data and a difference between the characteristic information of the first data and the characteristic information of the second data. The data collector 150 may determine whether the first data has been sufficiently collected, based on the amount, distribution state, and the like of the first data stored in the data storage 130. For example, when the amount of the first data is greater than a preset value or the distribution state of the first data is similar to a normal distribution, the data collector 150 may determine that the first data has been sufficiently collected. However, embodiments of the disclosure are not limited thereto, and the data collector 150 may determine whether the first data has been sufficiently collected, according to various criteria.

When the first data has been sufficiently collected, the data collector 150 may collect data having different characteristics from the first data from the external device. Accordingly, when the difference between the characteristic information of the first data and the characteristic information of the second data is equal to or greater than the first threshold value, the data collector 150 may determine that the second data is received. However, embodiment of the disclosures of the disclosure are not limited thereto, and the data collector 150 may determine whether the characteristic information of the first data is different from the characteristic information of the second data, according to various criteria.

Alternatively, when the first data has not been sufficiently collected, the data collector 150 may collect data having similar characteristics to the first data from the external device. Accordingly, when the difference between the characteristic information of the first data and the characteristic information of the second data is less than the second threshold value, the data collector 150 may determine that the second data is received. For example, when a difference between a mean value of the first data and a mean value of the second data is less than the second threshold value, the data collector 150 may determine that the second data is received.

The data collector 150 according to an embodiment may determine whether the second data is received, by comparing the demographic information of the first user with the demographic information of the second user. For example, the first data may be associated with the demographic information of the first user, which is data about the first user, and the second data may be associated with the demographic information of the second user, which is data about the second user.

Accordingly, when the first data is sufficiently collected and the demographic information of the first user is not similar to the demographic information of the second user, the data collector 150 may determine that the second data is received. For example, when a difference between a mean value of the demographic data (for example, data related to the height, weight, gender, and the like of the first user) of the first user and a mean value of the demographic data (for example, data related to the height, weight, gender, and the like of the second user) of the second user is equal to or greater than a third threshold value, the data collector 150 may determine that the second data is received. However, embodiments of the disclosure are not limited thereto, and the data collector 150 may determine whether the demographic information of the first user is similar to the demographic information of the second user, according to various criteria.

Alternatively, when the first data is not sufficiently collected and the demographic information of the first user is similar to the demographic information of the second user, the data collector 150 may determine that the second data is received. For example, when a difference between a mean value of demographic data of the first user and a mean value of demographic data of the second user is less than a fourth threshold value, the data collector 150 may determine that the second data is received.

When the data collector 150 determines that the second data is received, the communication interface 140 may request the second device 200 for second data. At this time, the communication interface 140 may transmit information of the number of necessary samples for the second data to the second device 200.

The communication interface 140 may receive the second data from the second device 200, and the data storage 130 may store the second data received from the second device 200 together with at least one of the characteristic information of the second data or the demographic information of the second user.

The data collector 150 may determine the training data by using the stored first data and the stored second data. For example, the data collector 150 may determine a ratio between the first data and the second data that is to be included in the training data, based on the characteristic information of the first data and the characteristic information of the second data. For example, the data collector 150 may include at least a portion of the first data and at least a portion of the second data in the training data so that a preset balance of characteristic information for the training data is maintained.

Alternatively, the data collector 150 may determine the ratio between the first data and the second data, which is to be included in the training data, based on the demographic information of the first data and the demographic information of the second data. For example, the data collector 150 may include at least a portion of the first data and at least a portion of the second data in the training data so that a preset balance of demographic information for the training data is maintained.

The AI model generator 160 may generate an AI model, based on the training data determined by the data collector 150. In this case, the AI model may be an authentication model that authenticates a user, but embodiments are not limited thereto. The AI model according to an embodiment of the disclosure may include one or more neural networks, and the one or more neural networks may be trained based on training data.

The second device 200 according to an embodiment of the disclosure may include a sensing unit 210, a data analyzer 220, a data storage 230, and a communication interface 240.

The sensing unit 210 may sense the status of the second device 200 or the status of the surroundings of the second device 200 and may transmit second data corresponding to the sensed status to the data analyzer 220. The sensing unit 210 may include, but is not limited to, at least one of an image sensor, a touch sensor, an acceleration sensor, a position sensor (e.g., a global positioning system (GPS)), a temperature/humidity sensor, a magnetic sensor, a gyroscope sensor, or a microphone. The sensing unit 210 may sense touch information, voice information, position information, step length information, and the like of the second device user (second user).

The data analyzer 220 may obtain the characteristic information of the second data and the demographic information of the second user by analyzing the second data collected via the sensing by the sensing unit 210. A method of obtaining the characteristic information of the second data and the demographic information of the second user has been described in detail above during the description of the data analyzer 120 of the first device 100, and thus a detailed description thereof will be omitted.

The data storage 230 may store the second data obtained by the sensing unit 210 together with at least one of the characteristic information of the second data analyzed by the data analyzer 220 or the demographic information of the second user.

The communication interface 240 may receive the ID information of the first device 100 and the data sharing request from the first device 100.

When the first device user is authenticated, the communication interface 240 may transmit at least one of the characteristic information of the second data or the demographic information of the second user to the first device 100.

When the second data is requested by the first device 100, the communication interface 240 may also transmit the second data to the first device 100. At this time, the communication interface 240 may receive information about the number of necessary data samples from the first device 100, and may transmit sampled second data to the first device 100, based on the information about the number of necessary data samples.

Figure 3:
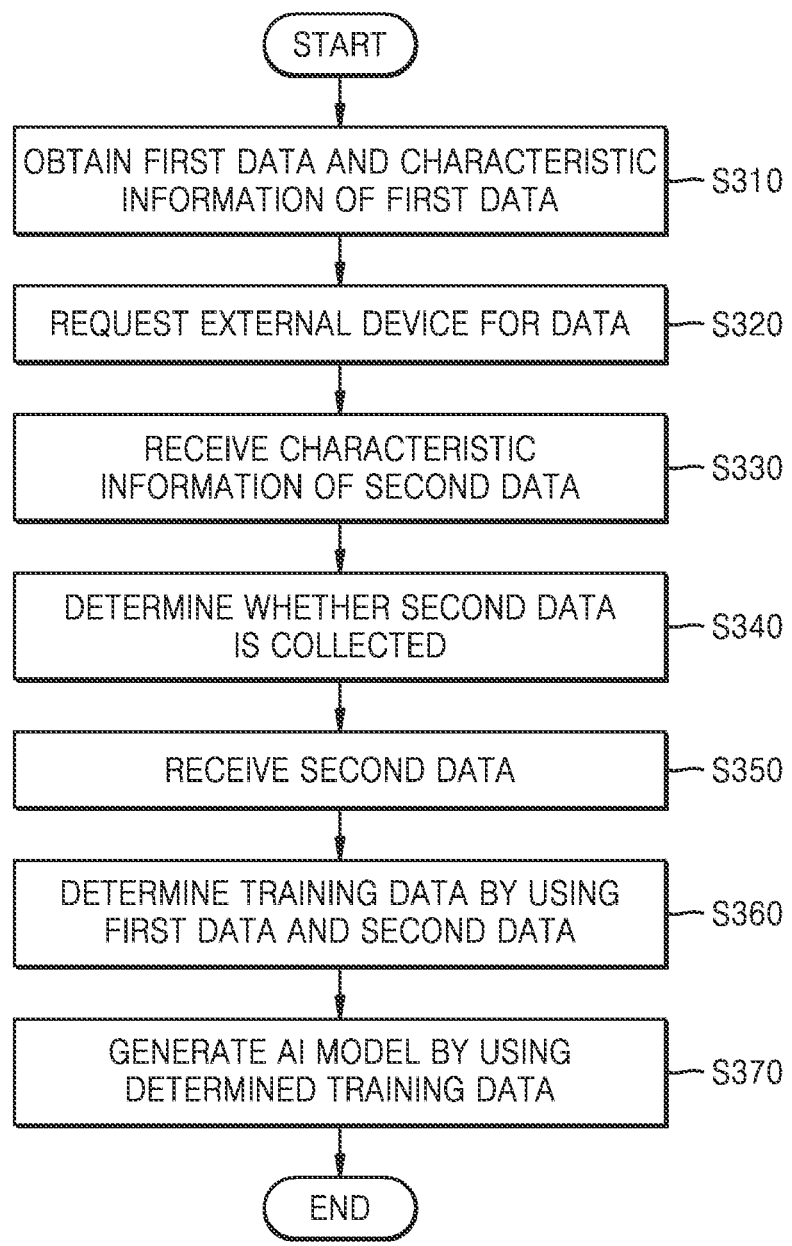
FIG. 3 is a flowchart of a method, performed by a first device, of generating an AI model by collecting training data, according to an embodiment of the disclosure.

FIG. 3 is a flowchart of a method, performed by a first device, of generating an AI model by collecting training data, according to an embodiment of the disclosure.

The first device 100 according to an embodiment of the disclosure may generate or update the AI model. To generate or update the AI model, training data for training the AI model is needed.

Referring to FIG. 3, a first device 100 may obtain first data and characteristic information of the first data at operation S310. For example, the first device 100 may obtain the first data by sensing touch information, voice information, position information, step length information, and the like of the first device user (first user). The first device 100 may obtain the characteristic information of the first data by analyzing the data collected via the sensing. In this case, the characteristic information of the first data may include distribution information of the first data, and the distribution information of the first data may include at least one of an average, a standard deviation, a variance, a maximum value, a minimum value, or a distribution curve of the first data. The first device 100 may obtain the demographic information of the first user, based on the collected first data.

The first device 100 may request an external device for data at operation S320. For example, the first device 100 may search for a peripheral device for collecting the training data. When a found peripheral device is the same type of device as that of the first device 100 or includes the same function as that of the first device 100, the first device 100 may receive a response from the peripheral device. When a found peripheral device is the same type of device as that of the first device 100 or includes the same function as that of the first device 100, the first device 100 may transmit a data sharing request to the found peripheral device.

When the peripheral device authenticates the first device user in response to the data sharing request and accepts the data sharing request, the first device 100 may receive the characteristic information of the second data (peripheral device user data) from the peripheral device at operation S330.

The first device 100 according to an embodiment of the disclosure may determine whether the second data is collected, based on the collection state of the first data, the characteristic information of the first data, and the characteristic information of the second data at operation S340. This will now be described in detail with reference to FIGS. 4 and 5.

Figure 4:
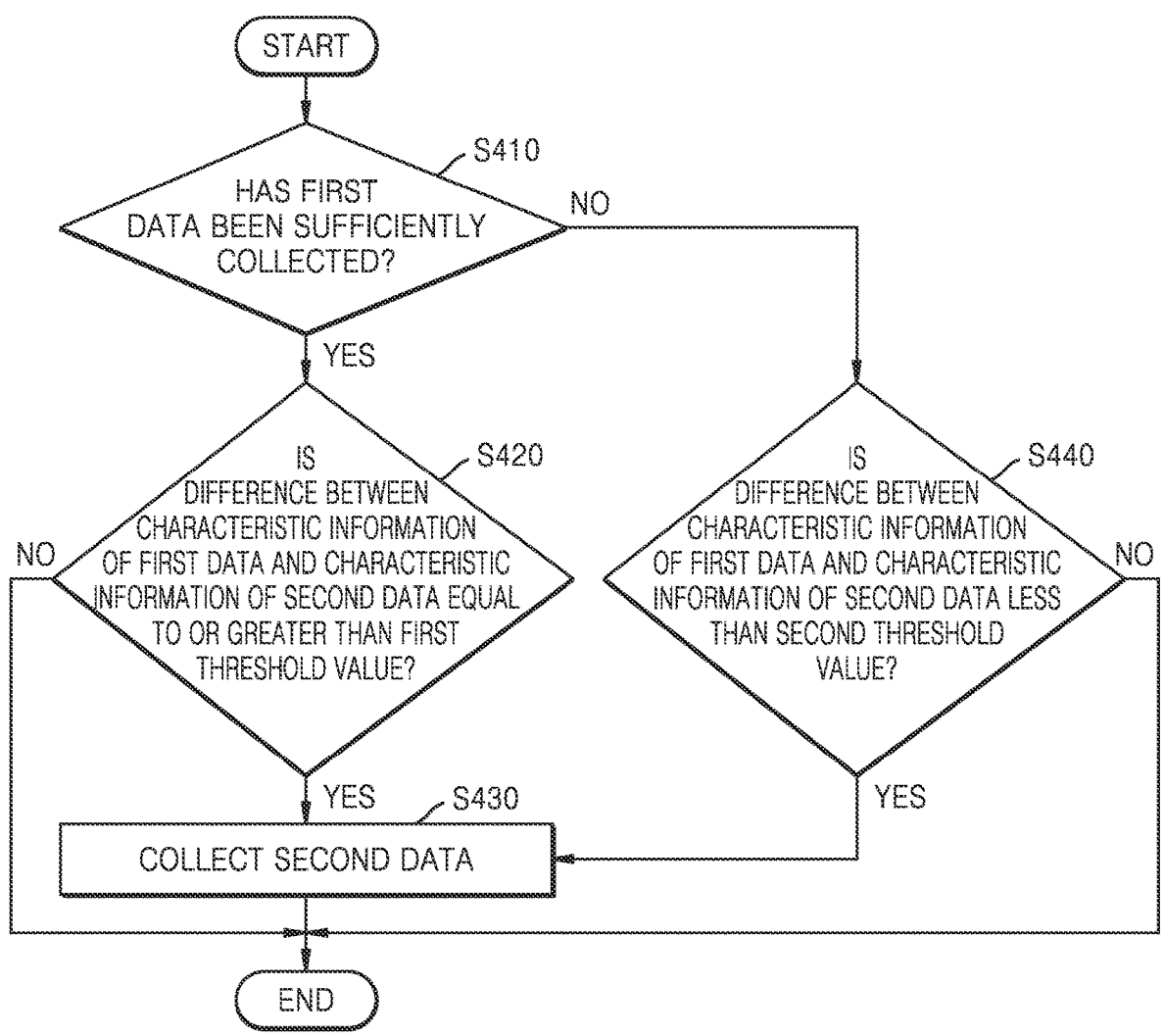
FIG. 4 is a flowchart illustrating an operation of FIG. 3 in detail according to an embodiment of the disclosure.

FIG. 4 is a flowchart illustrating an operation of FIG. 3 in detail according to an embodiment of the disclosure.

Referring to FIG. 4, depicting operation S340 of FIG. 3, a first device 100 according to an embodiment of the disclosure may determine whether the first data has been sufficiently collected at operation S410.

For example, when the collection amount of the first data is equal to or greater than a preset value, the first device 100 may determine that the first data has been sufficiently collected. Alternatively, when the distribution state of the first data is similar to a normal distribution, the first device 100 may determine that the first data has been sufficiently collected. However, embodiments of the disclosure are not limited thereto.

When it is determined that the first data has been sufficiently collected, the first device 100 may determine whether the difference between the characteristic information of the first data and the characteristic information of the second data is equal to or greater than the first threshold value at operation S420. When the difference between the characteristic information of the first data and the characteristic information of the second data is equal to or greater than the first threshold value, the first device 100 may determine that the second data is collected at operation S430.

On the other hand, when the difference between the characteristic information of the first data and the characteristic information of the second data is less than the first threshold value, the first device 100 may determine that the second data is not collected.

When it is determined that the first data has not been sufficiently collected, the first device 100 may determine whether the difference between the characteristic information of the first data and the characteristic information of the second data is less than the second threshold value at operation S440. When the difference between the characteristic information of the first data and the characteristic information of the second data is less than the second threshold value, the first device 100 may determine that the second data is collected at operation S430.

On the other hand, when the difference between the characteristic information of the first data and the characteristic information of the second data is equal to or greater than the second threshold value, the first device 100 may determine that the second data is not collected.

Figure 5:
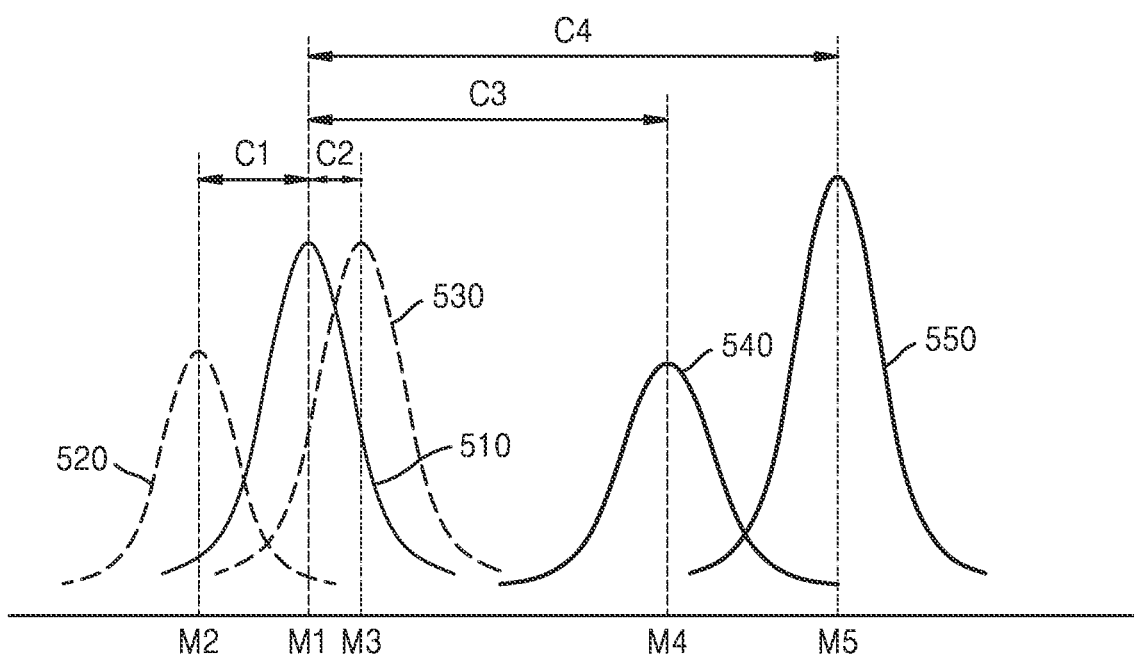
FIG. 5 illustrates graphs showing distribution information of first data and second data, according to an embodiment of the disclosure.

FIG. 5 illustrates graphs showing distribution information of first data and second data, according to an embodiment of the disclosure.

Referring to FIG. 5, a first distribution curve 510 may show distribution information of first data, and one of second through fifth distribution curves 520, 530, 540, and 550 may show the distribution information of second data.

The characteristic information of the data according to an embodiment of the disclosure may include the distribution information of the data, and the difference between the characteristic information of the first data and the characteristic information of the second data may be represented as the difference between the mean value of the first data and the mean value of the second data.

For example, when the first data is sufficiently collected and the second data has the second distribution curve 520 or the third distribution curve 530, the first device 100 may determine that the second data is not collected, because a difference C1 or C2 between the mean value M1 of the first data and the mean value M2 or M3 of the second data is less than the first threshold value.

On the other hand, when the first data is sufficiently collected and the second data has the fourth distribution curve 540 or the fifth distribution curve 550, the first device 100 may determine that the second data is collected, because a difference C3 or C4 between the mean value M1 of the first data and the mean value M4 or M5 of the second data is equal to or greater than the first threshold value.

Alternatively, when the first data is not sufficiently collected and the second data has the second distribution curve 520 or the third distribution curve 530, the first device 100 may determine that the second data is collected, because the difference C1 or C2 between the mean value M1 of the first data and the mean value M2 or M3 of the second data is less than the second threshold value.

On the other hand, when the first data is not sufficiently collected and the second data has the fourth distribution curve 540 or the fifth distribution curve 550, the first device 100 may determine that the second data is not collected, because the difference C3 or C4 between the mean value M1 of the first data and the mean value M4 or M5 of the second data is equal to or greater than the second threshold value.

Referring back to FIG. 3, when the first device 100 determines that the second data is collected, the first device 100 may request the second device 200 for the second data and may receive the second data from the second device 200 at operation S350.

The first device 100 may determine the training data by using pre-stored first data and the second data received from the second device 200 at operation S360.

For example, the first device 100 may determine a ratio between the first data and the second data that is to be included in the training data, based on the characteristic information of the first data and the characteristic information of the second data. The first device 100 may include at least a portion of the first data and at least a portion of the second data in the training data so that a preset balance of characteristic information for the training data is maintained.

The first device 100 may generate or update the AI model by using the determined training data at operation S370.

Figure 6:
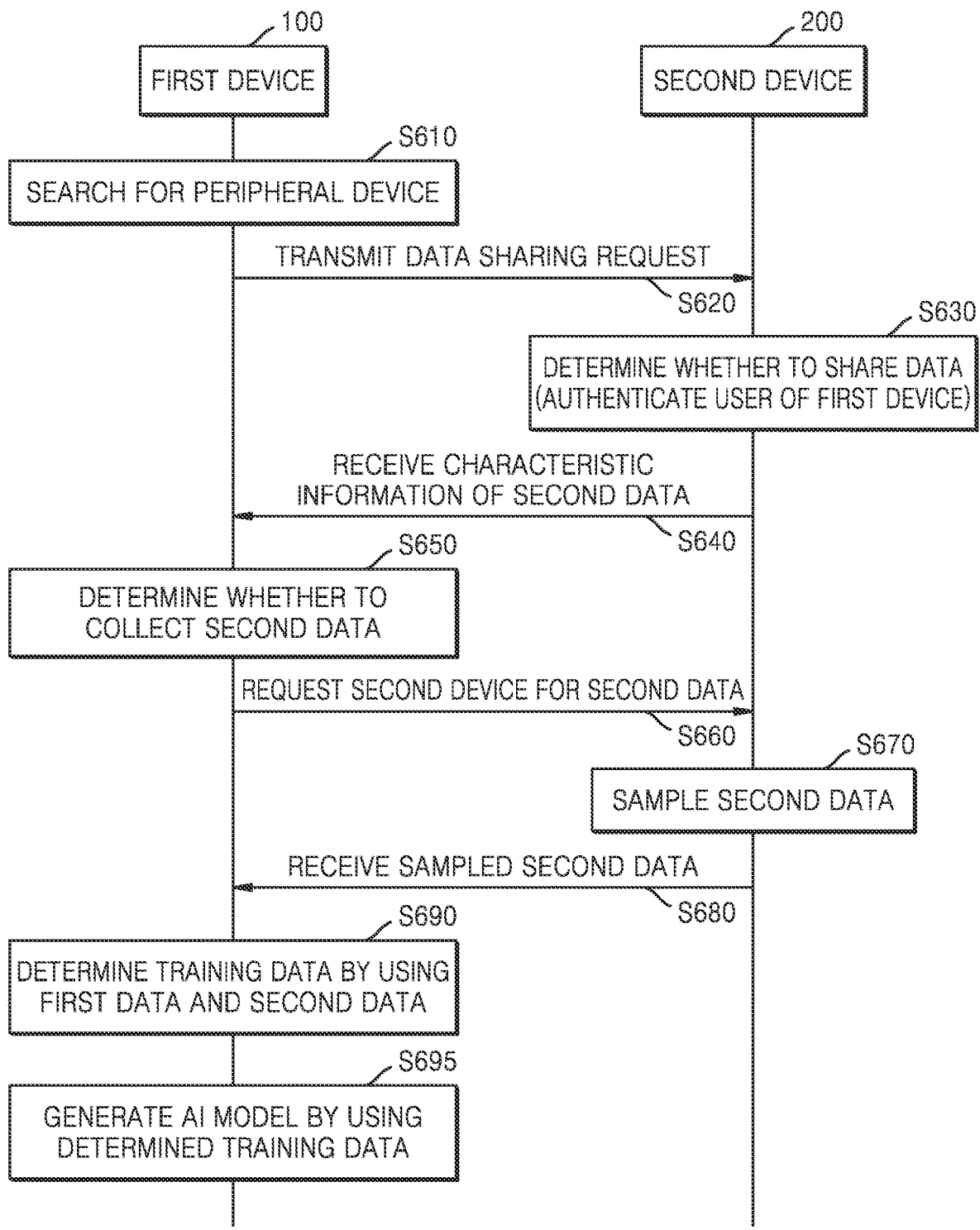
FIG. 6 is a flowchart of a method, performed by a first device, of collecting data of a second device, according to an embodiment of the disclosure.

FIG. 6 is a flowchart of a method, performed by a first device, of collecting data of a second device, according to an embodiment of the disclosure.

The first device 100 according to an embodiment of the disclosure may periodically collect the training data, collect the training data, based on a user input, or collect the training data when generation or updating of the AI mode is needed. However, embodiments of the disclosure are not limited thereto.

Referring to FIG. 6, a first device 100 may search for a peripheral device for collecting the training data at operation S610. When the second device 200 around the first device 100 is found, the first device 100 may transmit the data sharing request to the second device 200 at operation S620. The first device 100 may transmit the ID information of the first device 100 to the second device 200, and the second device 200 may authenticate a user of the first device 100 and determine whether data is shared, based on the ID information of the first device 100 at operation S630.

When the second device 200 authenticates the first device user and accepts the data sharing request, the second device 200 may transmit the characteristic information of the second data to the first device 100 at operation S640.

Alternatively, when the second device 200 authenticates the first device user and transmits a response signal accepting the data sharing request to the first device 100, the first device 100 may request the second device 200 for the characteristic information of the second data. The second device 200 may perform operation S640 in response to a request of the first device 100.

The characteristic information of the second data may include distribution information representing statistical characteristics of the second data. For example, the distribution information of the second data may include at least one of an average, a standard deviation, a variance, a maximum value, a minimum value, or a distribution curve of the second data. However, embodiments of the disclosure are not limited thereto.

The first device 100 may determine whether the second data is collected, based on the collection state of the first data, the characteristic information of the first data, and the characteristic information of the second data received from the second device 200 at operation S650.

This has been described above in detail with reference to FIGS. 4 and 5, and thus a repeated description thereof will be omitted.

When the first device 100 determines that the second data is received, the first device 100 may request the second device 200 for the second data (S660). At this time, the first device 100 may also transmit the sample number information of the second data. Because the number of training data necessary for training or the number of training data optimized for training differs in each AI model, the first device 100 may determine the number of necessary samples of the second data according to the characteristics of the AI model desired to be generated or updated, and may transmit the determined number of samples to the second device 200.

The second device 200 may sample the second data, based on the sample number information of the second data received from the first device 100 at operation S670. At this time, the second device 200 may perform random sampling. The second device 200 may again obtain the characteristic information of the second data, based on the sampled second data.

The second device 200 may transmit the sampled second data to the first device 100 at operation S680. At this time, the second device 200 may transmit the characteristic information of the sampled second data to the first device 100.

The first device 100 may determine the training data by using pre-stored first data and the second data received from the second device 200 at operation S690.

For example, the first device 100 may determine a ratio between the first data and the second data that is to be included in the training data, based on the characteristic information of the first data and the characteristic information of the second data. The first device 100 may include at least a portion of the first data and at least a portion of the second data in the training data so that a preset balance of characteristic information for the training data is maintained.

The first device 100 may generate or update the AI model by using the determined training data at operation S695.

Figure 7:
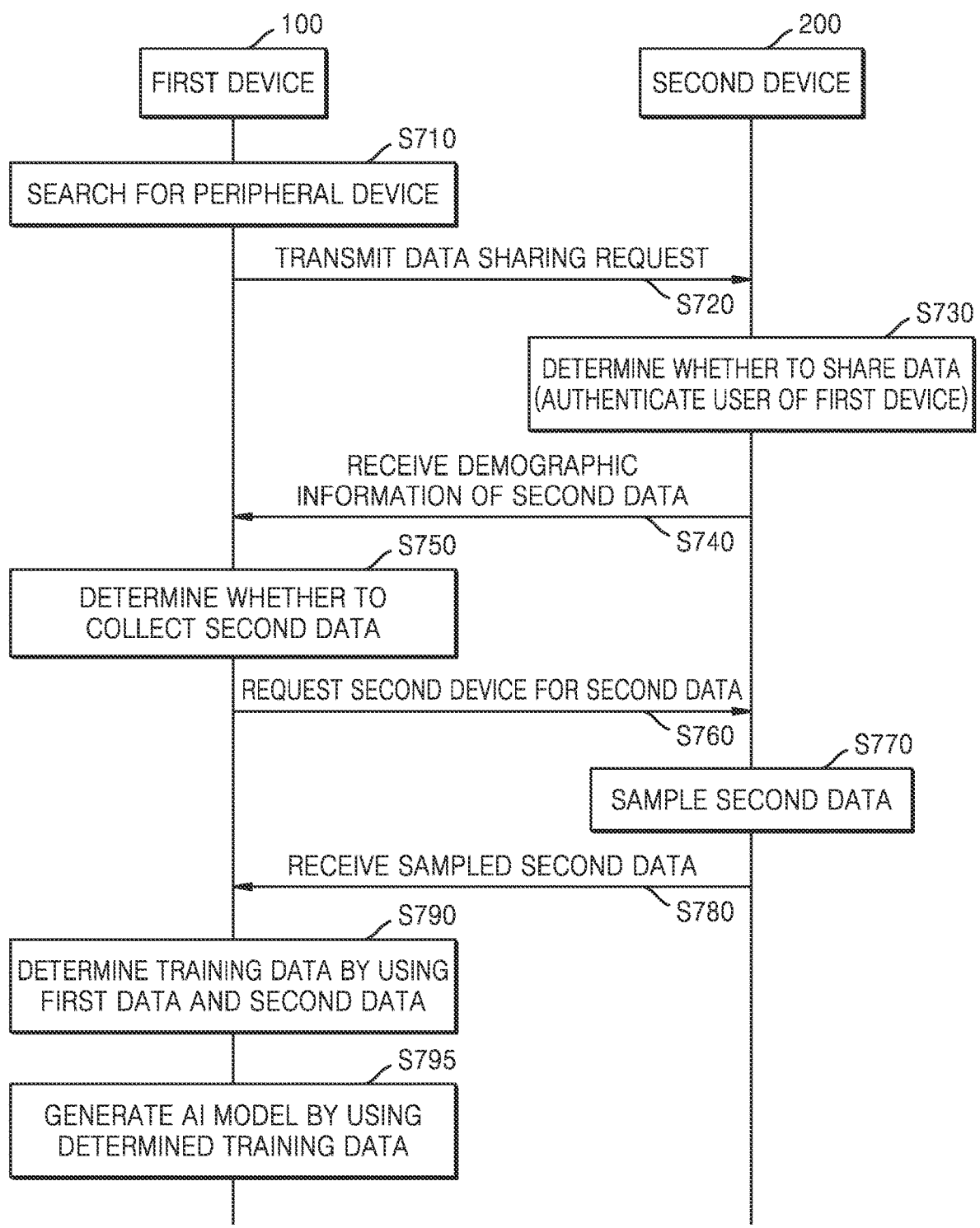
FIG. 7 is a flowchart of a method, performed by a first device, of collecting data of a second device, according to an embodiment of the disclosure.

FIG. 7 is a flowchart of a method, performed by a first device, of collecting data of a second device, according to an embodiment of the disclosure.

Referring to FIG. 7, a first device 100 according to an embodiment of the disclosure may search for a peripheral device for collecting training data at operation S710. When the second device 200 around the first device 100 is found, the first device 100 may transmit the data sharing request to the second device 200 at operation S720. The first device 100 may transmit the ID information of the first device 100 to the second device 200, and the second device 200 may authenticate the user of the first device 100 and determine whether to share data, based on the ID information of the first device 100 at operation S730.

When the second device 200 authenticates the first device user and accepts the data sharing request, the second device 200 may transmit the demographic information of the second device user (second user) to the first device 100 at operation S740.

Alternatively, when the second device 200 authenticates the first device user and transmits a response signal accepting the data sharing request to the first device 100, the first device 100 may request the second device 200 for the demographic information of the second user. The second device 200 may perform operation S740 in response to a request of the first device 100.

The demographic information of the second user may include information about the finger thickness or hand size of the second user obtained based on touch data of the second user, information about the height or weight of the second user obtained based on step distance information of the second user, information about the gender of the second user obtained based on voice information of the second user, a location of a house or office of the second user obtained based on location information of the second user, information about an occupational group or the like of the second user, and information about a language used by the second user obtained based on keyboard type information used by the second user. However, embodiments of the disclosure are not limited thereto.

The first device 100 may determine whether to collect the second data, based on the collection state of the first data, the demographic information of the first user, and the demographic information of the second user at operation S750.

The first device 100 may determine whether to collect the second data, based on the difference between the demographic information of the second user and the demographic information of the first user received from the second device 200. When it is determined that the first data has been sufficiently collected and the difference between the demographic information of the first user and the demographic information of the second user is equal to or greater than a third threshold value, the first device 100 may determine that the second data is collected. For example, when the first data has been sufficiently collected, the gender of the first user obtained based on the first data is a woman, and the gender information of the second user indicates a man, the first device 100 may determine that the second data is collected. When the first data has been sufficiently collected, the height information of the first user obtained based on the first data indicates 150 cm, and the height information of the second user indicates 165 cm or greater, the first device 100 may determine that the second data is collected. However, embodiments of the disclosure are not limited thereto.

Alternatively, when it is determined that the first data has not been sufficiently collected and the difference between the demographic information of the first user and the demographic information of the second user is less than a fourth threshold value, the first device 100 may determine that the second data is collected. For example, when the first data has not been sufficiently collected, the gender of the first user obtained based on the first data is a woman, and the gender information of the second user indicates a woman, the first device 100 may determine that the second data is collected. When the first data has not been sufficiently collected, the height information of the first user obtained based on the first data indicates 150 cm, and the height information of the second user indicates a range of 140 cm to 160 cm, the first device 100 may determine that the second data is collected. However, embodiments of the disclosure are not limited thereto.

When the first device 100 determines that the second data is collected, the first device 100 may request the second device 200 for the second data at operation S760, and the second device 200 may sample the second data at operation S770, and may transmit the sampled second data to the first device 100 at operation S780. At this time, the second device 200 may transmit the characteristic information of the sampled second data to the first device 100.

The first device 100 may determine the training data by using pre-stored first data and the second data received from the second device 200 at operation S790.

For example, the first device 100 may determine a ratio between the first data and the second data that is to be included in the training data, based on the characteristic information of the first data and the characteristic information of the second data. Alternatively, the first device 100 may determine the ratio between the first data and the second data, which is to be included in the training data, based on the demographic information of the first data and the demographic information of the second data.

The first device 100 may include at least a portion of the first data and at least a portion of the second data in the training data so that a preset balance of characteristic information for the training data or a preset balance of demographic information for the training data is maintained.

The first device 100 may generate or update the AI model by using the determined training data at operation S795.

Figure 8:
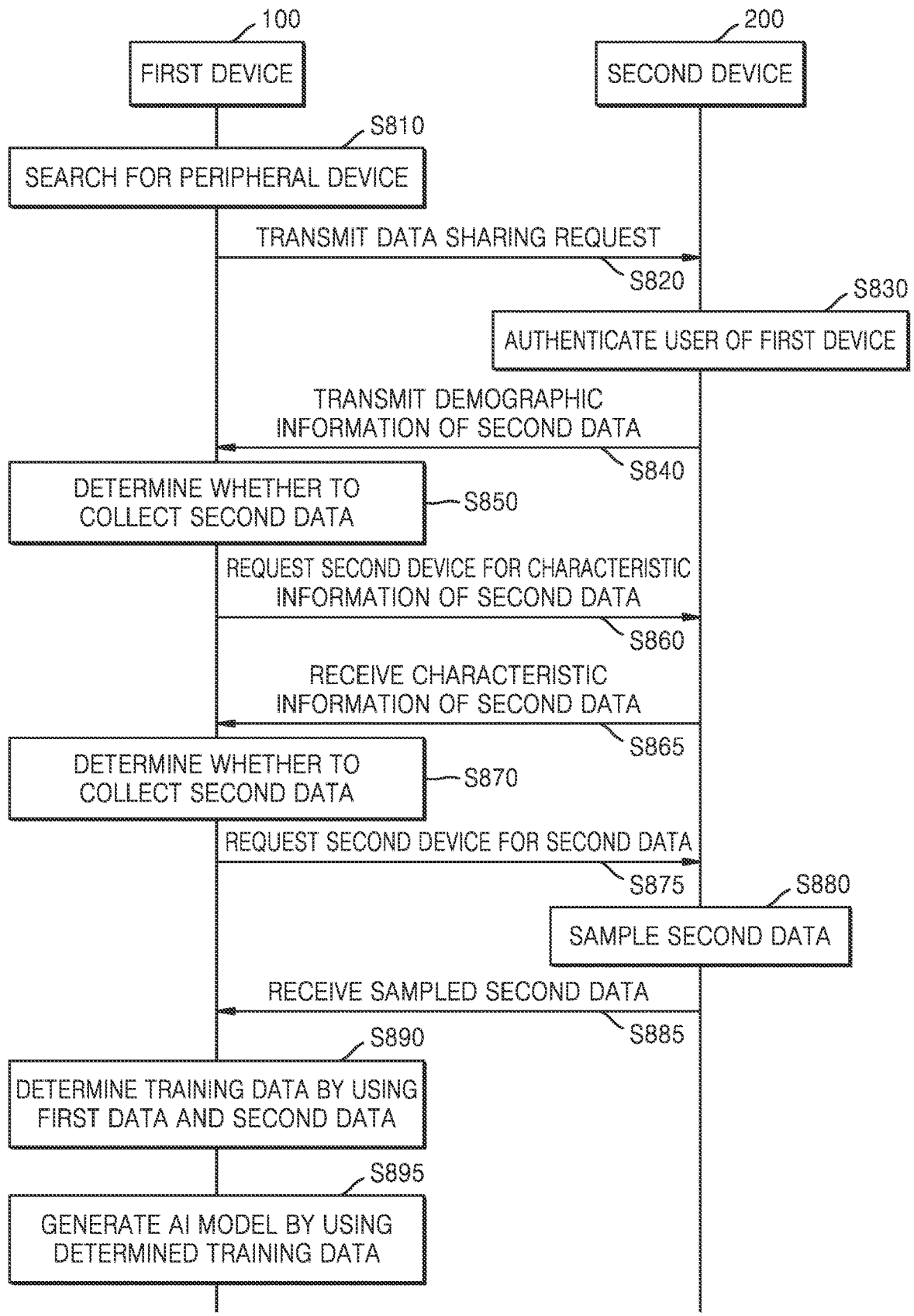
FIG. 8 is a flowchart of a method, performed by a first device, of collecting data of a second device, according to an embodiment of the disclosure.

FIG. 8 is a flowchart of a method, performed by a first device, of collecting data of a second device, according to an embodiment of the disclosure.

Operations S810, S820, S830, S840, and S850 of FIG. 8 correspond to operations S710, S720, S730, S740, and S750 of FIG. 7, and thus repeated descriptions thereof will be omitted.

Referring to FIG. 8, when a first device 100 determines that the second data is collected, a first device 100 may request a second device 200 for the characteristic information of the second data at operation S860 and may receive the characteristic information of the second data from the second device 200 at operation S865.

The first device 100 may determine whether the second data is collected, based on the collection state of the first data, the characteristic information of the first data, and the characteristic information of the second data received from the second device 200 at operation S870.

Because operation S870 of FIG. 8 corresponds to operation S650 of FIG. 6, a repeated description thereof will be omitted.

When the first device 100 determines that the second data is received, the first device 100 may request the second device 200 for the second data at operation S875. The second device 200 may sample the second data at operation S880, and may transmit the sampled second data to the first device 100 at operation S885.

The first device 100 may determine the training data by using pre-stored first data and the second data received from the second device 200 at operation S890. Because operation S890 of FIG. 8 corresponds to operation S650 of FIG. 6, a repeated description thereof will be omitted.

The first device 100 may generate or update the AI model by using the determined training data at operation S895.

Figure 9:
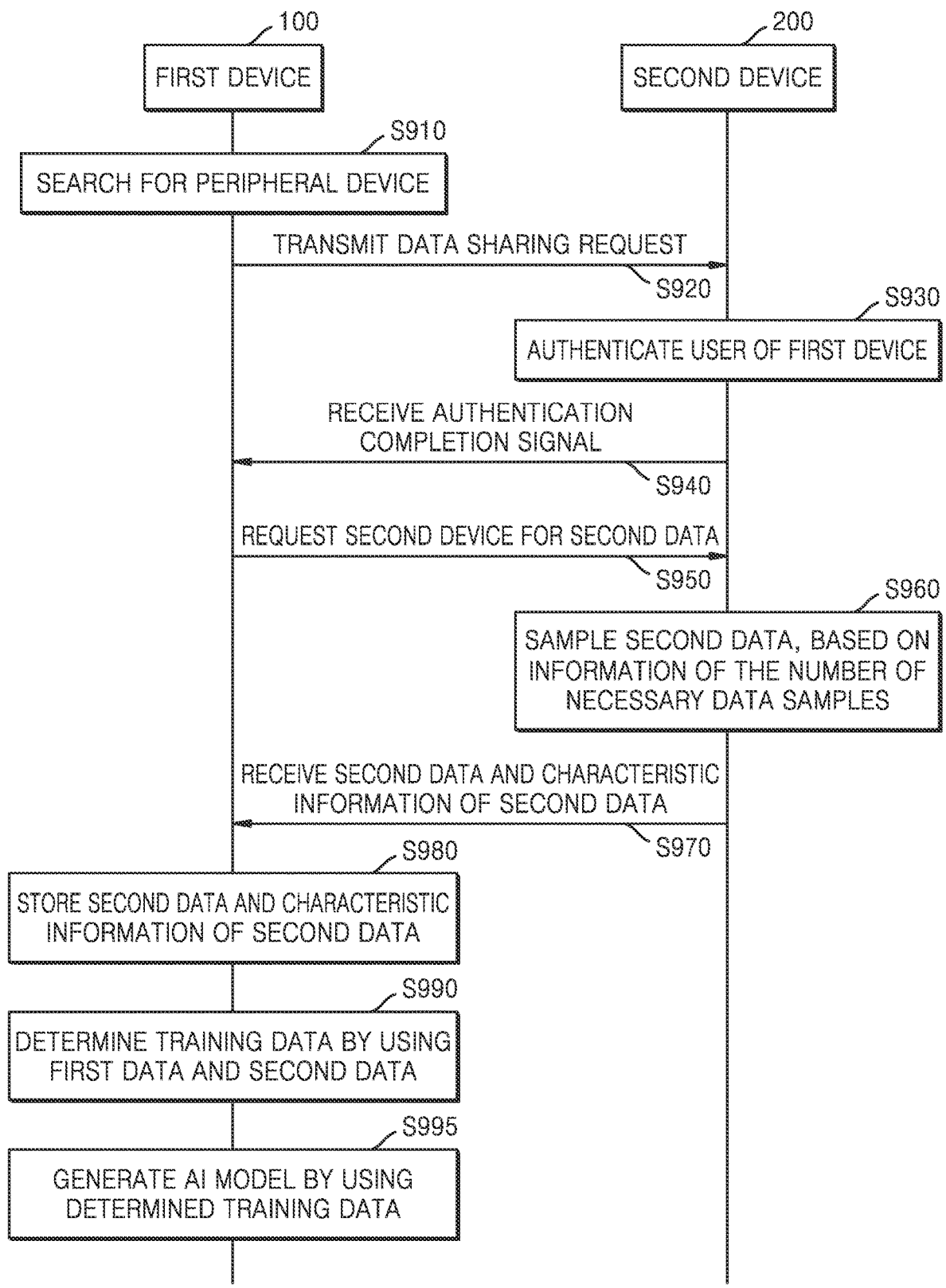
FIG. 9 is a flowchart of a method, performed by a first device, of collecting data of a second device, according to an embodiment of the disclosure.

FIG. 9 is a flowchart of a method, performed by a first device, of collecting data of a second device, according to an embodiment of the disclosure.

Operations S910, S920, and S930 of FIG. 9 correspond to operations S710, S720, and S730 of FIG. 7, and thus repeated descriptions thereof will be omitted.

Referring to FIG. 9, when a second device 200 authenticates a first device user and accepts a data sharing request, the second device 200 may transmit an authentication completion signal to a first device 100 at operation S940.

In response to the authentication completion signal, the first device 100 may request the second device 200 for the second data at operation S950. At this time, the first device 100 may also transmit the sample number information of the second data, for example. Because the number of training data necessary for training or the number of training data optimized for training differs in each AI model, the first device 100 may determine the number of necessary samples of the second data according to the characteristics of the AI model desired to be generated or updated, and may transmit the determined number of samples to the second device 200.

The second device 200 may sample the second data, based on the sample number information of the second data received from the first device 100 at operation S960. At this time, the second device 200 may perform random sampling. The second device 200 may obtain the characteristic information of the second data, based on the sampled second data.

The second device 200 may transmit the characteristic information of the sampled second data to the first device 100 at operation S970.

The first device 100 may store the second data and the characteristic information of the second data received from the second device 200 at operation S980, and may determine the training data by using the first data and the second data at operation S990.

For example, the first device 100 may determine the ratio between the first data and the second data that is to be included in the training data, based on the characteristic information of the first data and the characteristic information of the second data. The first device 100 may include at least a portion of the first data and at least a portion of the second data in the training data so that a preset balance of characteristic information for the training data is maintained.

The first device 100 may generate or update the AI model by using the determined training data at operation S995.

Figure 10:
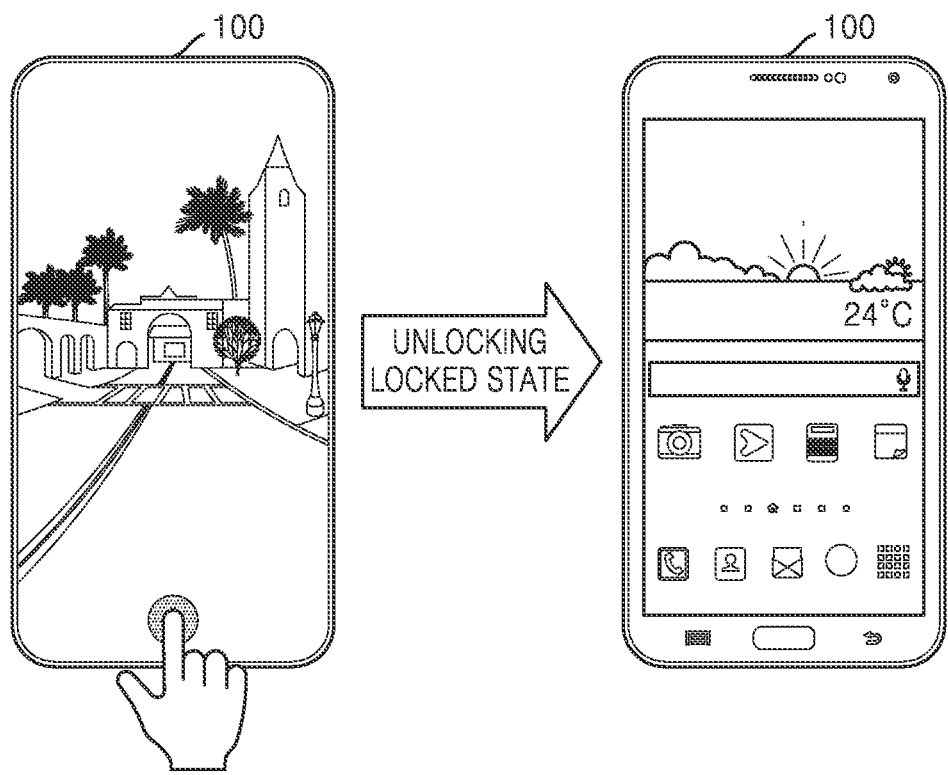
FIG. 10 is a diagram used to explain a method, performed by a first device, of performing authentication by using an AI model, according to an embodiment of the disclosure.

FIG. 10 is a diagram used to explain a method, performed by a first device, of performing authentication by using an AI model, according to an embodiment of the disclosure.

Referring to FIG. 10, a first device 100 according to an embodiment of the disclosure may store an AI model generated by using first data and second data as training data. The AI model may determine whether input data is data of the first device user (first user). For example, referring to FIG. 10, the first device 100 may sense touch data, and the AI model may receive the sensed touch data as input data. The AI model may determine whether the received touch data is the touch data of the first user, and may output a result of the determination as resultant data.

When it is determined that the received touch data is the touch data of the first user, the first device 100 may perform a locking release of the first device, and, when it is determined that the received touch data is not the touch data of the first user, the first device 100 may maintain a locked state of the first device.

Although FIG. 10 illustrates and describes a user authentication method based on touch data, embodiments of the disclosure are not limited thereto. The first device 100 may generate an AI model by using various other data, and may perform user authentication by using the generated AI model.

Figure 11:
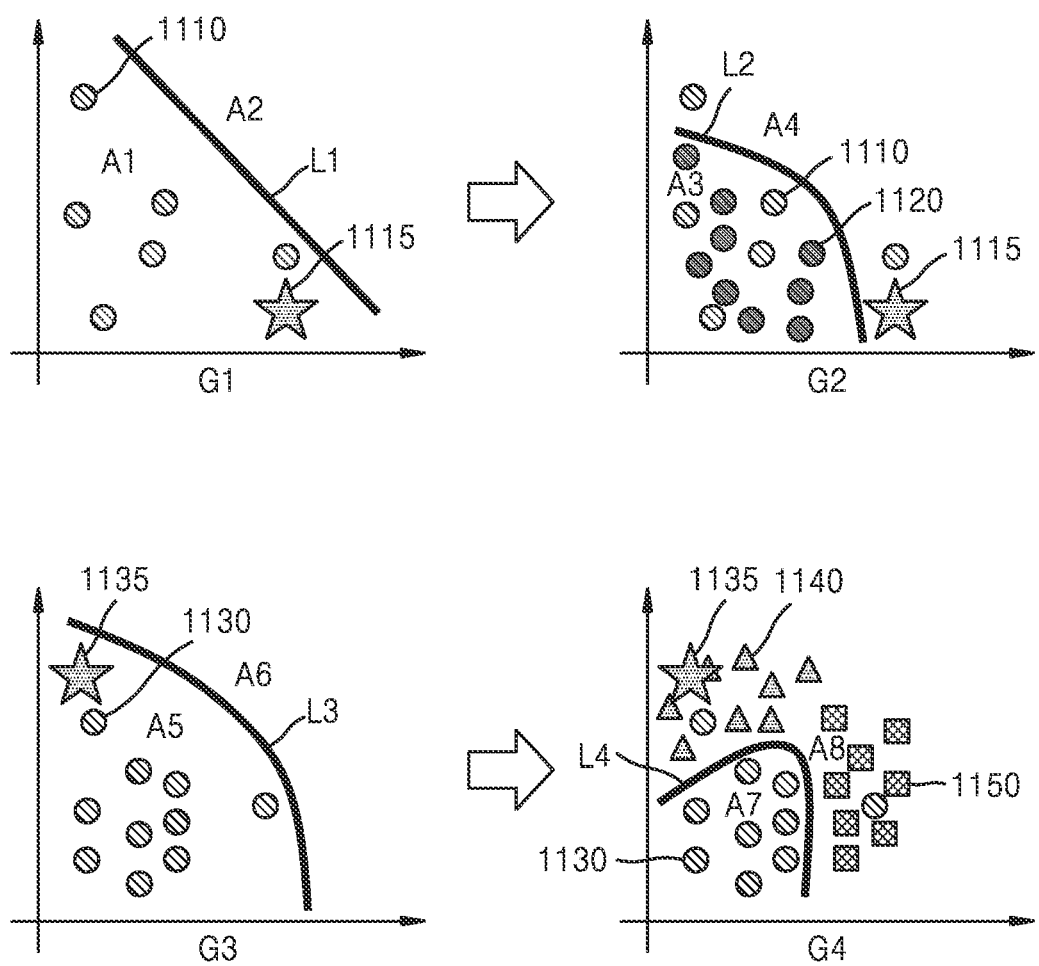
FIG. 11 illustrates graphs used to describe the performance of an AI model generated based on training data, according to an embodiment of the disclosure.

FIG. 11 illustrates graphs used to describe the performance of an AI model generated based on training data, according to an embodiment of the disclosure.

Referring to FIG. 11, a first graph G1 shows a result of a first AI model generated by a first device 100 by using first data as the training data. This case may be a case where first data 1110 has not been sufficiently collected. For example, the first device 100 may generate the first AI model by using only first data 1110 (data of the first device user) sensed by the first device 100 as the training data. When data located in a first area A1 based on a first line L1 is sensed, the generated first AI model may recognize that the sensed data is first user data. When data located in a second area A2 is sensed, the generated first AI model may not recognize that the sensed data is not as the first user data.

A second graph G2 shows a result of a second AI model generated by the first device 100 by using the first data 1110 and second data 1120 having similar characteristic information to the first data 1110 as the training data. For example, when data located in a third area A3 based on a second line L2 is sensed, the generated second AI model may recognize that the sensed data is the first user data, and, when data located in a fourth area A4 is sensed, may recognize that the sensed data is not the first user data.

For example, when data 1115 of another user similar to the first user data is sensed, the first AI model may recognize that the data 1115 of the other user is the first user data, whereas the second AI model may recognize that the data 1115 of the other user is not the first user data. Accordingly, the second AI model is high in the accuracy of recognition of the first user than the first AI model.

A third graph G3 shows a result of a third AI model generated by the first device 100 by using third data 1130 as the training data. This case may be a case where the third data 1130 has been sufficiently collected. For example, the first device 100 may generate the third AI model by using only the third data 1130 sensed by the first device 100 as the training data. When data located in a fifth area A5 based on a third line L3 is sensed, the generated third AI model may recognize that the sensed data is the first user data. When data located in a sixth area A6 is sensed, the generated third AI model may recognize that the sensed data is not the first user data.

A fourth graph G4 shows a result of a fourth AI model generated by the first device 100 by using the third data 1130 and fourth data 1140 and fifth data 1150 both having different characteristic information from the third data 1130 as the training data. For example, when data located in a seventh area A7 based on a fourth line L4 is sensed, the generated fourth AI model may recognize that the sensed data is the first user data, and, when data located in an eighth area A8 is sensed, may recognize that the sensed data is not the first user data.

For example, when data 1135 of another user similar to the first user data is sensed, the third AI model may recognize that the data 1135 of the other user is the first user data, whereas the fourth AI model may not recognize that the data 1135 of the other user is not the first user data. Accordingly, the fourth AI model is high in the accuracy of recognition of the first user than the third AI model.

Figure 12:
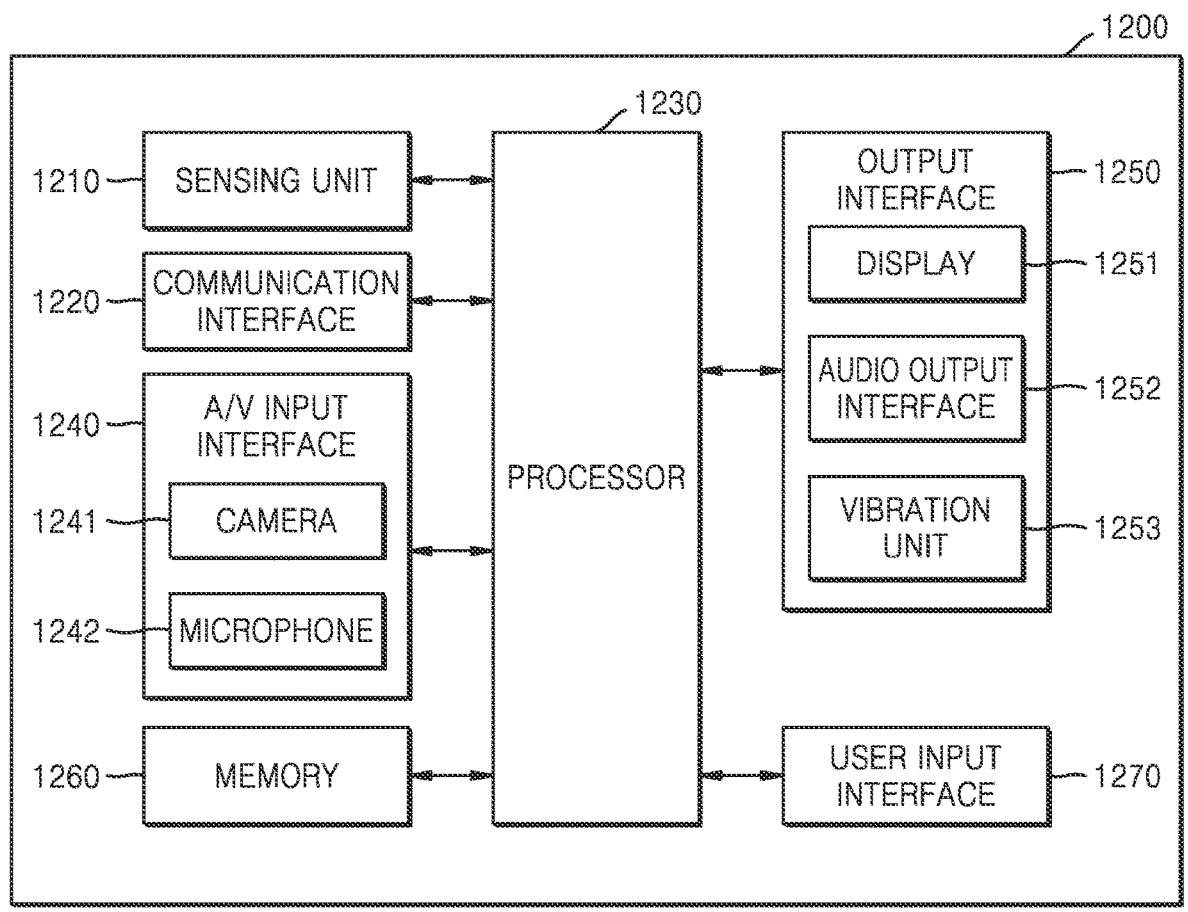
FIG. 12 is a block diagram of a structure of first device according to an embodiment of the disclosure.

FIG. 12 is a block diagram of a structure of a first device according to an embodiment of the disclosure. A first device 1200 of FIG. 12 may be an embodiment of the first device 100 of FIG. 1.

Referring to FIG. 12, the first device 1200 according to an embodiment may include a sensing unit 1210, a communication interface 1220, a processor 1230, an audio/video (A/V) input interface 1240, an output interface 1250, a memory 1260, and a user input interface 1270.

The sensing unit 1210 may include not only a sensor (for example, a fingerprint recognition sensor) for sensing biometric information of a user, but also a sensor for sensing a state of the first device 1200 or a state of the surroundings of the first device 1200. The sensing unit 1210 may transmit information sensed by a sensor to the processor 1230. The sensing unit 1210 of FIG. 12 may correspond to the sensing unit 110 of FIG. 2.

The communication interface 1220 corresponds to the communication interface 140 of FIG. 2 described above in detail with reference to FIG. 2, and thus a repeated description thereof will be omitted.

The processor 1230 according to an embodiment of the disclosure may control overall operations of the first device 1200. The processor 1230 may control other components included in the first device 1200 so that a certain operation is performed.

The processor 1230 according to an embodiment of the disclosure may execute one or more programs stored in the memory 1260. The processor 1230 may include a single core, a dual core, a triple core, a quad core, or a multiple core thereof. The processor 1230 may include a plurality of processors.

The memory 1260 according to an embodiment of the disclosure may store various pieces of data, programs, or applications for driving and controlling the first device 1200.

A program stored in the memory 1260 may include one or more instructions. A program (one or more instructions) or application stored in the memory 1260 may be executed by the processor 1230.

The processor 1230 according to an embodiment of the disclosure may correspond to at least one of the data analyzer 120, the data collector 150, or the AI model generator 160 described above with reference to FIG. 2, and the memory 1260 according to an embodiment of the disclosure may correspond to the data storage 130 of FIG. 2.

The memory 1260 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk.

The A/V input interface 1240 inputs an audio signal or a video signal, and may include a camera 1241 and a microphone 1242. The camera 1241 may acquire an image frame, such as a still image or a moving picture, via an image sensor in a video call mode or a photography mode. An image captured via the image sensor may be processed by the processor 1230 or a separate image processor (not shown).

The image frame obtained by the camera 1241 may be stored in the memory 1260 or transmitted to the outside via the communication interface 1220. At least two cameras 1241 may be included according to embodiments of the first device 1200.

The microphone 1242 receives an external audio signal and converts the external audio signal into electrical audio data. For example, the microphone 1242 may receive an audio signal from an external device or a speaking person. The microphone 1242 may use various noise removal algorithms in order to remove noise that is generated while receiving the external audio signal.

The output interface 1250 outputs an audio signal, a video signal, or a vibration signal, and may include a display 1251, an audio output interface 1252, and a vibration unit.

The audio output interface 1252 outputs audio data that is received from the communication interface 1220 or stored in the memory 1260. The audio output interface 1252 may also output an audio signal (for example, a call signal receiving sound, a message receiving sound, a notification sound) related with a function of the first device 1200. The audio output interface 1252 may include, for example, a speaker and a buzzer.

The vibration unit 1253 may output a vibration signal. For example, the vibration unit 1253 may output a vibration signal corresponding to an output of audio data or video data (for example, a call signal receiving sound or a message receiving sound). The vibration unit 1253 may also output a vibration signal when a touch screen is touched.

The user input interface 1270 denotes a unit via which a user inputs data for controlling the first device 1200. For example, the user input interface 1270 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

A method of operating a first device according to an embodiment of the disclosure may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for the inventive concept or may be well-known to and usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disc (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

Also, first devices or operation methods of the first devices according to the disclosed embodiments may be provided in a computer program product. Computer program products are commodities and thus may be traded between sellers and buyers.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. Alternatively, in a case where there is a third device (e.g., a smartphone) in communication with the server or client device, the computer program product may include a storage medium of the third device. Alternatively, the computer program product may include the software program itself transmitted from the server to the client device or the third device, or transmitted from the third device to the client device.

In this case, one of the server, the client device, and the third device may execute the computer program product to perform the methods according to the disclosed embodiments. Alternatively, at least two of the server, the client device, and the third device may execute the computer program product to distribute and perform the methods according to the disclosed embodiments.

For example, a server (e.g., a cloud server or an artificial intelligence server) may execute a computer program product stored on a server to control a client device communicating with the server to perform the methods according to the disclosed embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device for collecting training data for generating an artificial intelligence (AI) model, the electronic device comprising:
   a sensor;
   a communication interface;
   memory storing one or more instructions; and
   a processor configured to execute the one or more instructions stored in the memory,
   wherein the processor is configured to execute the one or more instructions to:
   obtain first data by sensing data about a user of the electronic device using the sensor,
   obtain a first distribution information of the first data,
   control the communication interface to transmit a data request to an external device and receive a second distribution information of second data from the external device,
   determine whether to receive the second data from the external device, based on a collection amount of the first data, the first distribution information and the second distribution information,
   control the communication interface to receive the second data from the external device, based on the collection amount of the first data being less than a preset value and a difference between the first distribution information and the second distribution information less than a first threshold value, or based on the collection amount of the first data being greater than or equal to the preset value and the difference between the first distribution information and the second distribution information is greater than a second threshold value,
   determine training data including at least a portion of the first data and at least a portion of the second data, and
   generate the AI model, based on the determined training data,
   wherein the first distribution information of the first data includes at least one of an average, a standard deviation, a variance, a maximum value, a minimum value, or a distribution curve of the first data, and wherein the second distribution information of the second data includes at least one of an average, a standard deviation, a variance, a maximum value, a minimum value, or a distribution curve of the second data.

2. The electronic device of claim 1, wherein the processor is further configured to execute the one or more instructions to determine the training data so that a preset balance of characteristic information for the training data is maintained.

3. The electronic device of claim 1,
wherein the processor is further configured to:
execute the one or more instructions to obtain a first demographic information of the user of the electronic device, based on the data of the user of the electronic device,
control the communication interface to receive a second demographic information of a user of the external device, and
determine whether to receive the second data from the external device, based on the collection amount of the first data, the first demographic information and the second demographic information.

4. The electronic device of claim 3,
wherein the sensor is further configured to obtain at least one of touch information, voice information, location information, or step distance information of the user of the electronic device, and
wherein the processor is further configured to execute the one or more instructions to obtain the first demographic information of the user of the electronic device, based on at least one of the touch information, voice information, location information, step distance information of the user of the electronic device, or keyboard type information used by the user of the electronic device.

5. The electronic device of claim 3, wherein the processor is further configured to execute the one or more instructions to determine the training data so that at least one of a preset balance of characteristic information for the training data or a preset balance of demographic information for the training data is maintained.

6. The electronic device of claim 1, wherein the processor is further configured to:
execute the one or more instructions to search for the external device located around the electronic device, and
control the communication interface to transmit the data request to the external device, in response to a found external device satisfying a preset condition.

7. The electronic device of claim 1, wherein the processor is further configured to:
execute the one or more instructions to control the communication interface to transmit information of a number of necessary data samples to the external device, and
receive the second data sampled based on the information of the number of necessary data samples.

8. An operation method of an electronic device for collecting training data for generating an artificial intelligence (AI) model, the operation method comprising:
obtaining first data by sensing data about a user of the electronic device using a sensor;
obtaining a first distribution information of the first data;
transmitting a data request to an external device;
receiving a second distribution information of second data from the external device;
determining whether to receive the second data from the external device, based on a collection amount of the first data, the first distribution information and the second distribution information;
receiving the second data from the external device, based on the collection amount of the first data being less than a preset value and a difference between the first distribution information and the second distribution information less than a first threshold value, or based on the collection amount of the first data being greater than or equal to the preset value and the difference between the first distribution information and the second distribution information is greater than a second threshold value;
determining training data including at least a portion of the first data and at least a portion of the second data; and
generating the AI model, based on the determined training data,
wherein the first distribution information of the first data includes at least one of an average, a standard deviation, a variance, a maximum value, a minimum value, or a distribution curve of the first data, and
wherein the second distribution information of the second data includes at least one of an average, a standard deviation, a variance, a maximum value, a minimum value, or a distribution curve of the second data.

9. A non-transitory computer-readable recording medium storing a computer program, which, when executed by a computer, performs the method of claim 8.

* * * * *